US010157543B1

(12) United States Patent
Shah

(10) Patent No.: US 10,157,543 B1
(45) Date of Patent: Dec. 18, 2018

(54) SMART PARKING SYSTEM

(71) Applicant: Verizon Patent and Licensing Inc., Arlington, VA (US)

(72) Inventor: Sandipkumar V. Shah, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/785,279

(22) Filed: Oct. 16, 2017

(51) Int. Cl.
*G08G 1/14* (2006.01)
*G06K 9/00* (2006.01)

(52) U.S. Cl.
CPC ......... *G08G 1/144* (2013.01); *G06K 9/00771* (2013.01)

(58) Field of Classification Search
CPC .......... G08G 1/14–1/149; G08G 1/144; G01C 21/3685; G06K 9/00771
USPC .................. 340/932.2; 348/148, 149; 705/13
See application file for complete search history.

(56) References Cited

U.S. PATENT DOCUMENTS 7,135,991 B2 * 11/2006 Slemmer .................. G08G 1/14 340/932.2
9,773,413 B1 * 9/2017 Li .......................... G05D 1/021
2013/0258107 A1 * 10/2013 Delibaltov ......... G06K 9/00785 348/148
2014/0266800 A1 * 9/2014 Koukoumidis ........ G08G 1/141 340/932.2
2014/0266801 A1 * 9/2014 Uppal .................... G08G 1/144 340/932.2
2017/0219361 A1 * 8/2017 Mays .................. G08G 1/0112

* cited by examiner

*Primary Examiner* — Sisay Yacob

(57) ABSTRACT

An example device may include one or more memories and/or one or more processors, communicatively coupled to the one or more memories, to determine that a vehicle is to park in a parking lot; receive information relating to one or more parking spots of the parking lot where the information may be received from a monitoring device of the parking lot; determine a state of the one or more parking spots of the parking lot based on the information from the monitoring device of the parking lot; calculate a probability of availability for the one or more parking spots based on weighted parameters corresponding to one or more characteristics of the one or more parking spots, where the weighted parameters may be weighted based on a characteristic associated with the vehicle; select a parking destination from the one or more parking spots based on the probability of availability of the one or more parking spots; and/or perform an action associated with the selected parking destination.

20 Claims, 6 Drawing Sheets

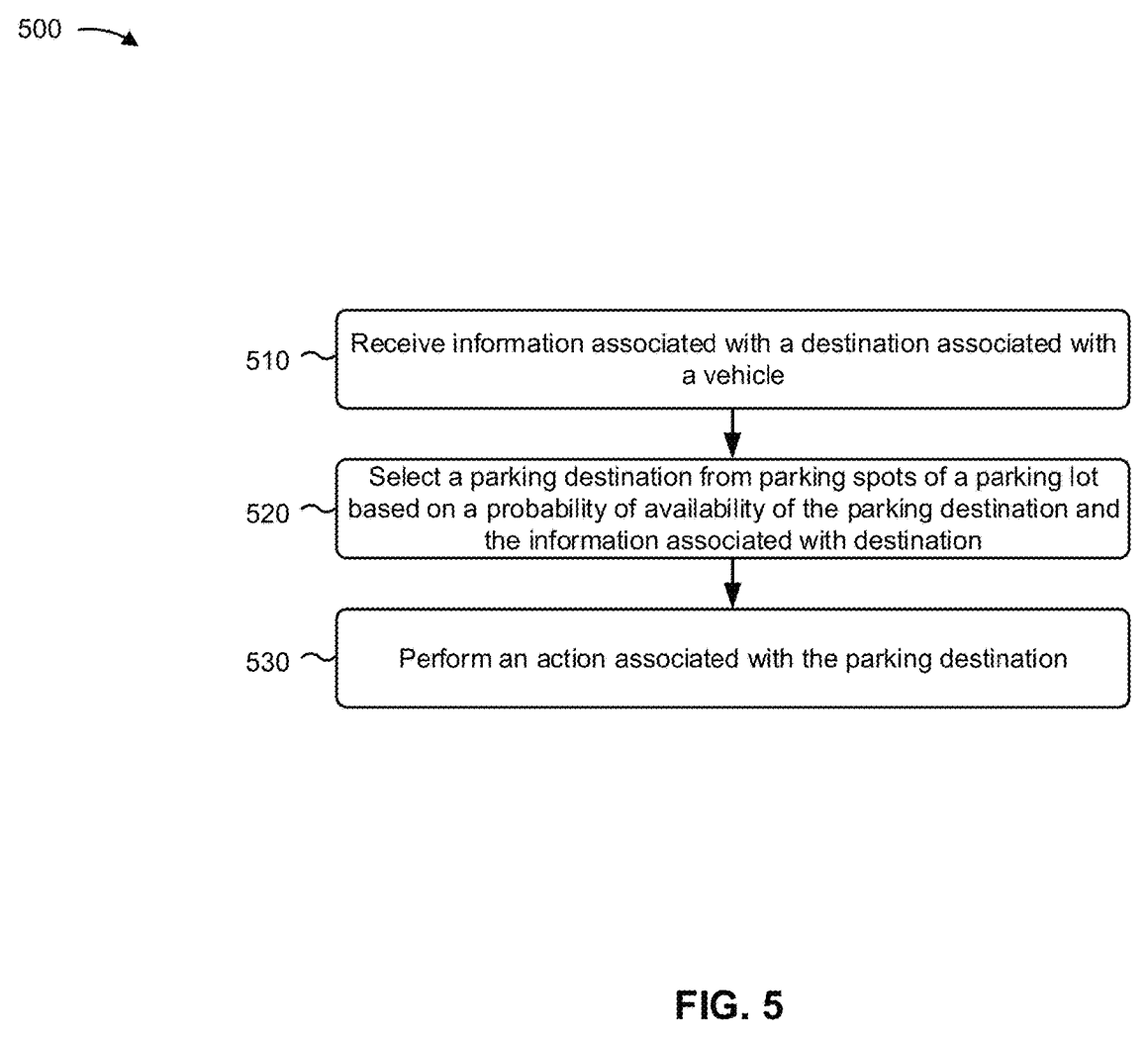

500

510 Receive information associated with a destination associated with a vehicle

520 Select a parking destination from parking spots of a parking lot based on a probability of availability of the parking destination and the information associated with destination 530 Perform an action associated with the parking destination

FIG. 5

SMART PARKING SYSTEM

BACKGROUND

A parking lot (or car park) is an area that includes multiple parking spots intended for parking vehicles. Parking lots can be situated in urban and/or rural areas near or adjacent to destinations such as places of business, recreational areas, industrial parks, churches, schools, and/or other similar venues. In some instances, parking lots can include multiple levels or stories (e.g., a parking structure, a parking elevator, and/or the like). In some instances, parking lots can include security devices and/or parking attendants that authorize and/or enable vehicle access to the parking lot (e.g., via a payment transaction, via an access card, and/or the like).

BRIEF DESCRIPTION OF THE DRAWINGS

FIGS. 4 and 5 are flow charts of example processes for identifying and/or indicating available and/or likely available parking spots of a parking lot.

DETAILED DESCRIPTION OF PREFERRED EMBODIMENTS

Figure 1A:
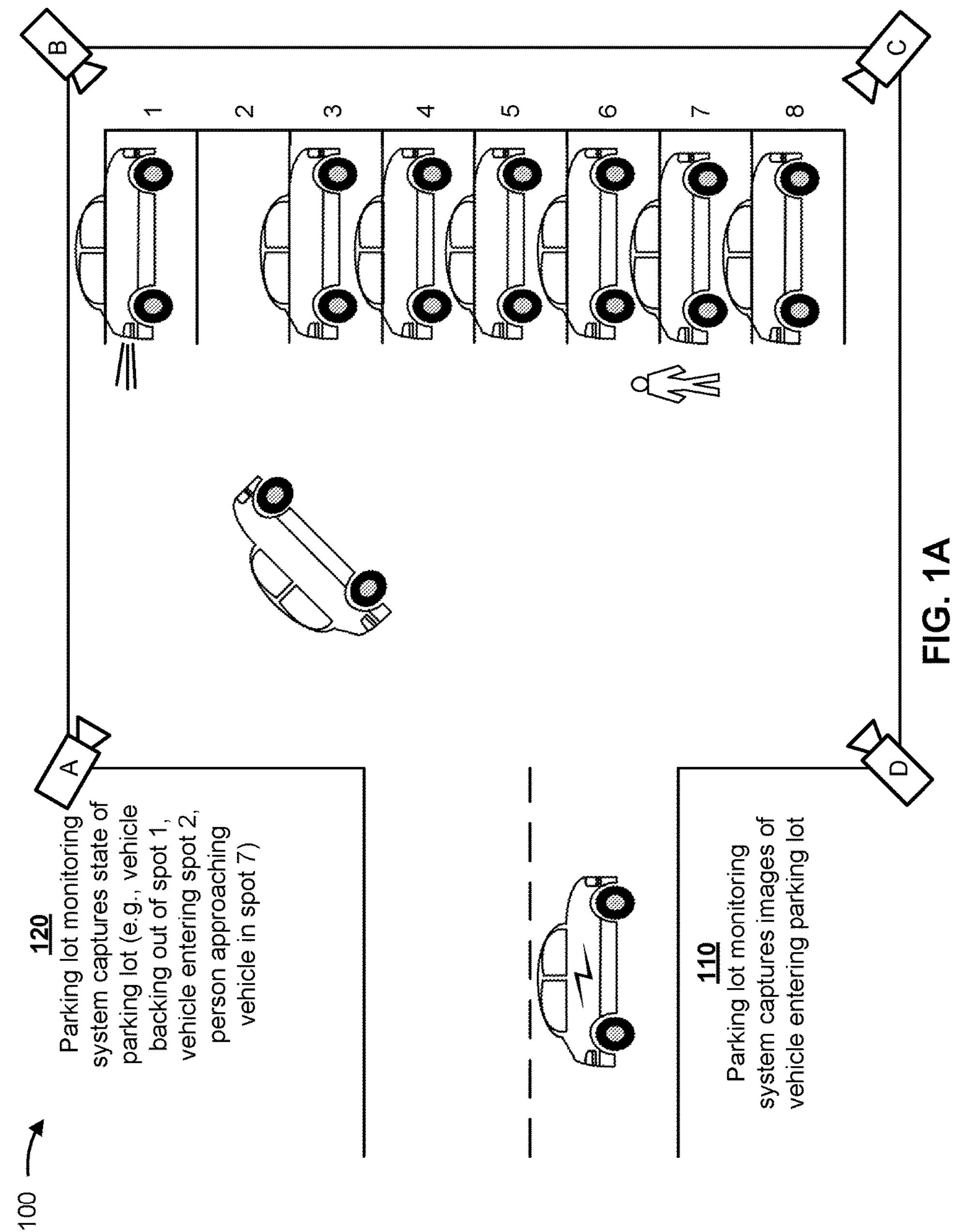
FIGS. 1A and 1B are diagrams of an overview of an example implementation described herein.

The following detailed description of example implementations refers to the accompanying drawings. The same reference numbers in different drawings can identify the same or similar elements.

Depending on a location of a parking lot and/or a time of the day, parking lots can be very busy and can potentially be at or near capacity. Accordingly, in many instances, after entering a parking lot or parking structure, drivers can spend an extended period of time trying to find available parking spots (i.e., allocated locations or spaces of a parking lot where the vehicle can be parked). During that extended period of time, the drivers can travel throughout the parking lot, seeking the available parking locations. Such time and travel can waste valuable resources of the driver and/or the vehicle. In some instances, a driver can approach a perceived available parking spot to find that the parking spot cannot accommodate the driver's vehicle (e.g., due to vehicle dimensions or type, or parking restrictions (e.g., handicap parking, employee parking, resident parking, zone parking, and/or the like). Furthermore, in some instances, a driver can eventually find a parking spot that is far from an ultimate destination of the driver (e.g., a parking spot at an opposite end of a parking lot as the ultimate destination), while other parking spots closer to the destination or that can accommodate the vehicle can be available or can soon be available for the driver to park. Accordingly, when searching for parking, drivers can waste various resources, including resources of the vehicle (e.g., fuel, tire tread, engine life, battery life, brake pads, processing resources, and/or the like).

Some implementations herein provide a parking system that facilitates identifying and/or providing available parking spots of a parking lot to a vehicle (or a driver or device of the vehicle) based on a probability that parking spots in the parking lot are available or will be available within a particular time period. For example, a parking system can monitor characteristics of parking spots of a parking lot to calculate a probability that the parking spot is available. Such characteristics can include whether there is a vehicle (or other object) in the parking spot, whether an individual is near the parking spot, whether a vehicle appears to be leaving the parking spot (e.g., the vehicle is running, is in reverse (has reverse lights on), and/or the like). Using the characteristics of the vehicle and/or the calculated probabilities, the parking system can indicate a parking destination (e.g., one of the available parking spots or likely available parking spots) for the vehicle. In some implementations, the parking system can identify and/or provide a best available parking spot for a vehicle based on a destination associated with the vehicle. For example, the destination associated with the vehicle can be a location indicated by an address entered in a global positioning system (GPS) of the vehicle or an address entered into a device associated with the vehicle (e.g., via an application, such as a parking application used to communicate with the parking system, a navigation application, a map application, and/or the like). Accordingly, examples herein can provide a parking system that enables a vehicle and/or a driver of a vehicle to relatively quickly identify available parking spots, thus saving vehicle resources.

Figure 1B:
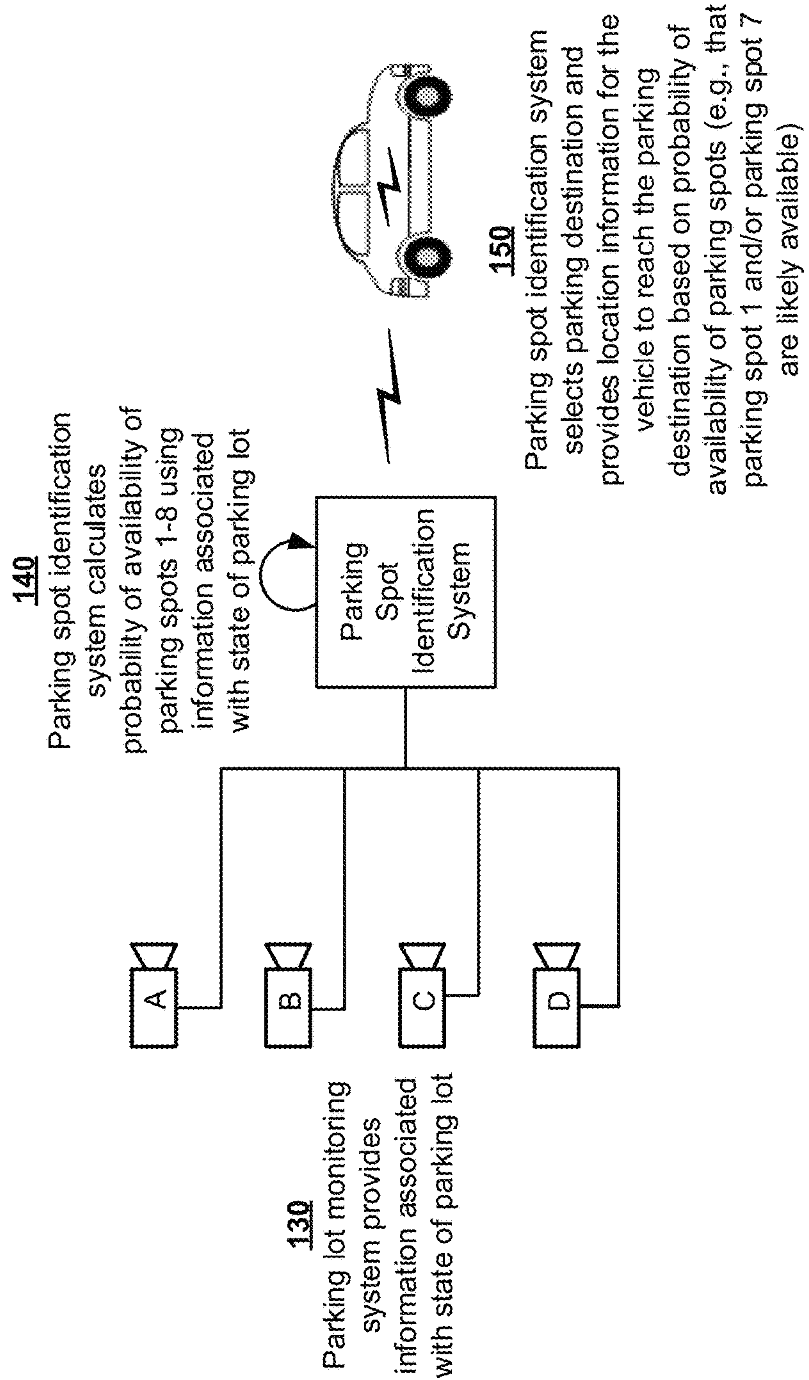

FIGS. 1A and 1B are diagrams of an overview of an example implementation 100 described herein. FIGS. 1A-1B show an example of identifying likely available parking spots of a parking lot and providing location information (e.g., geographical coordinates, navigation instructions, and/or the like) associated with the likely available parking spots to a vehicle (e.g., to a GPS installed in the vehicle, to a GPS of a device (e.g., a smartphone or GPS device) within the vehicle, and/or the like). As shown, the parking lot of the example implementation 100 includes 8 parking spots, labeled 1-8.

As shown in FIG. 1A, and by reference number 110, a parking lot monitoring system detects a vehicle entering the parking lot. For example, cameras A-D can capture images of the vehicle entering the parking lot. In some implementations, the parking lot monitoring system can utilize sensors, security devices, and/or the like to detect a vehicle entering the parking lot. As shown by reference number 120 in FIG. 1A, the parking lot monitoring system captures a state of the parking lot. For example, parking lot monitoring system captures images via cameras A-D indicating that parking spots 1 and 3-8 currently have vehicles in the parking spots, a vehicle is backing out of spot 1, that a vehicle is approaching spot 2, and that a person is approaching a vehicle in spot 7. In some implementations, sensors at the parking spots can indicate the state of the parking spots of FIG. 1A.

As shown in FIG. 1B, and by reference number 130, the parking lot monitoring system provides information associated with the parking lot. For example, the parking lot monitoring system can stream images from cameras and/or information from sensors to a parking spot identification system. As shown by reference number 140, the parking spot identification system calculates a probability of availability of parking spots 1-8 using information associated with the state of the parking lot. The parking spot identification system can determine, using image analysis (or data analysis), that parking spots 1 and 3-8 currently have vehicles in the parking spots, a vehicle is backing out of parking spot 1, that a vehicle is approaching parking spot 2, and that a person is approaching a vehicle in parking spot 7 at the time the vehicle enters the parking lot of FIG. 1A. Based on this information, the parking spot identification system can calculate a probability of availability of one or more of the parking spots 1-8. In some implementations, the parking spot identification system can monitor images from cameras A-D for a period of time (e.g., 5 seconds, 10 seconds, and/or the like) before calculating the probability of availability of the parking spots 1-8.

As further shown in FIG. 1B, and by reference number 150, the parking spot identification system selects a parking destination for the vehicle and provides location information for the vehicle to reach the parking destination based on the probability of the availability of the parking spots. In some implementations, the parking spot identification system can identify a highest probability that a parking spot is to be available (e.g., based on the image analysis). Accordingly, in the example implementation 100 of FIGS. 1A and 1B, the parking spot identification system can indicate to the vehicle (and/or provide navigation instructions to the vehicle) indicating that parking spot 1 and/or parking spot 7 are likely available. For example, the parking identification system, based on the vehicle backing out of parking spot 1 and/or the person present at parking spot 7 (which can indicate that the person is about to remove the vehicle from parking spot 7), can indicate the availability or the probability of availability of parking spots 1 and 7.

Accordingly, the example implementation 100 of FIGS. 1A-1B can identify and provide information indicating an availability of parking spots in a parking lot, thus saving a driver of a vehicle time and/or vehicle resources to search for and find a parking spot.

As indicated above, FIGS. 1A and 1B are provided merely as an example. Other examples are possible and can differ from what was described with regard to FIGS. 1A and 1B.

Figure 2:
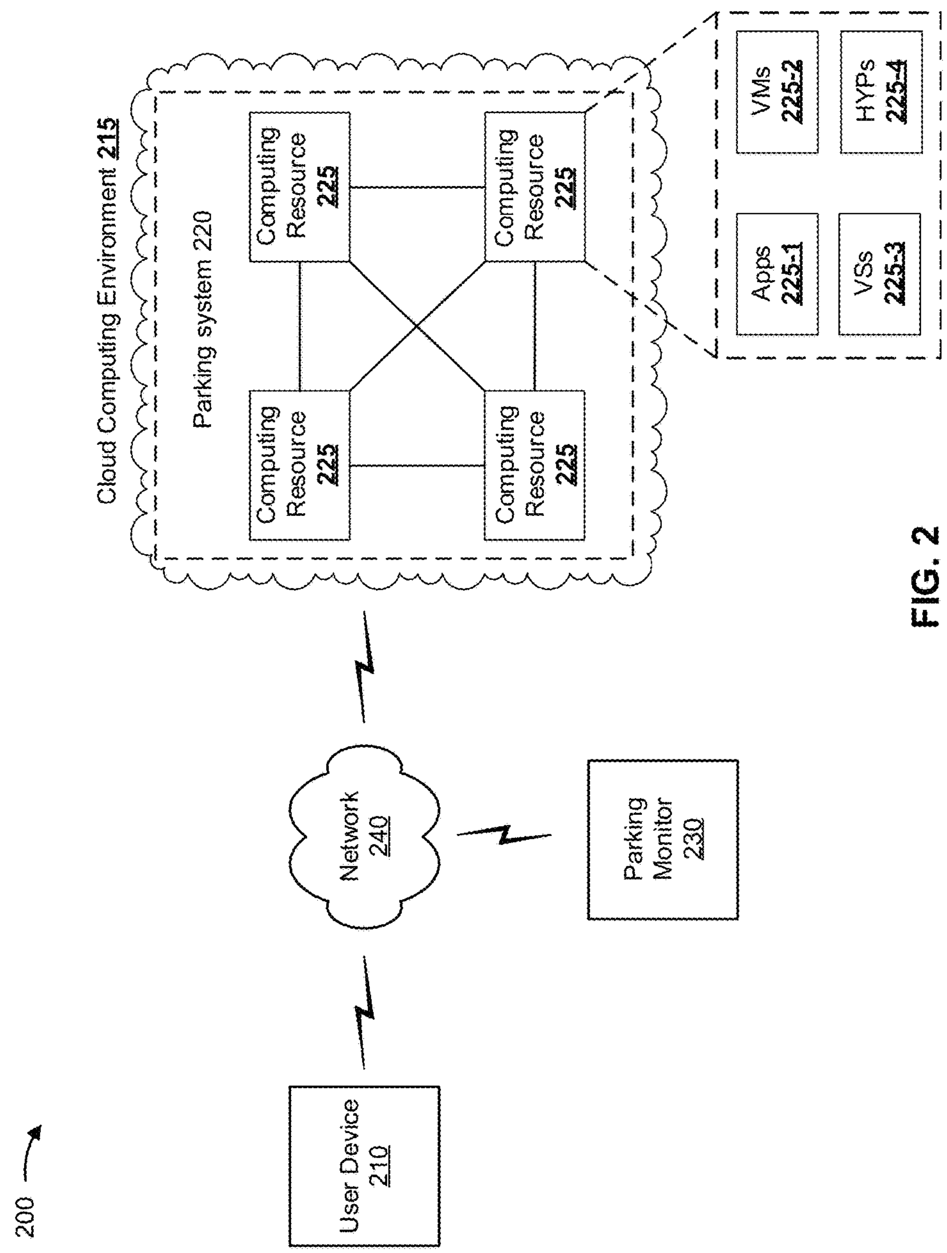
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, a cloud computing environment 215 including a parking system 220, a parking monitor 230, and a network 240. Devices of environment 200 can interconnect via wired connections, wireless connections, or a combination of wired and wireless connections.

User device 210 includes one or more devices capable of receiving, generating, storing, processing, and/or providing information associated with searching for and/or navigating to a parking lot, parking spot, or parking destination. For example, user device 210 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a vehicle (e.g., a control console, a dashboard control, and/or the like), a device of a vehicle, GPS device, or a similar type of device.

Cloud computing environment 215 includes an environment that delivers computing as a service, whereby shared resources, services, etc. may be provided to facilitate smart parking. Cloud computing environment 215 may provide computation, software, data access, storage, and/or other services that do not require end-user knowledge of a physical location and configuration of a system and/or a device that delivers the services. As shown, cloud computing environment 215 may include parking system 220 and one or more computing resources 225.

Parking system 220 includes one or more computing systems (e.g., computers or server devices) or groups of computing systems to identify available parking spots of a parking lot or a probability of availability of parking spots in the parking lot and/or providing information associated with the available parking spots and/or probability of the availability of the parking spots of the parking lot. In some implementations, parking system 220 can communicate with parking monitor 230 to receive information (e.g., image information, sensor data, and/or the like) associated with a parking lot. In some implementations, parking system 220 can provide information associated with a parking lot to user device 210 (e.g., information corresponding to available parking spots or likely available parking spots).

Computing resource 225 includes one or more personal computers, workstation computers, server devices, or another type of computation and/or communication device. In some implementations, computing resource 225 may host cloud computing environment 215. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by user device 210. Application 225-1 may eliminate a need to install and execute the software applications on user device 210. For example, application 225-1 may include software associated with cloud computing environment 215 and/or any other software capable of being provided via cloud computing environment 220. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., user device 205), and may manage infrastructure of cloud computing environment 220, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Parking monitor 230 includes a system of one or more monitoring devices for monitoring a parking lot, determining characteristics of parking spots or of a parking lot, and/or providing information associated with a state of a parking lot. For example, parking monitor 230 can include one or more cameras, sensors (e.g., radar sensors, motion sensors, pressure sensors, audio sensors, temperature sensors, and/or the like), security devices, and/or the like. Parking monitor 230 can communicate, to parking system 220, images from cameras, sensor data from sensors, security information from security devices, and/or any other information related to a parking lot from any other monitoring devices.

Network 240 includes one or more wired and/or wireless networks. For example, network 240 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
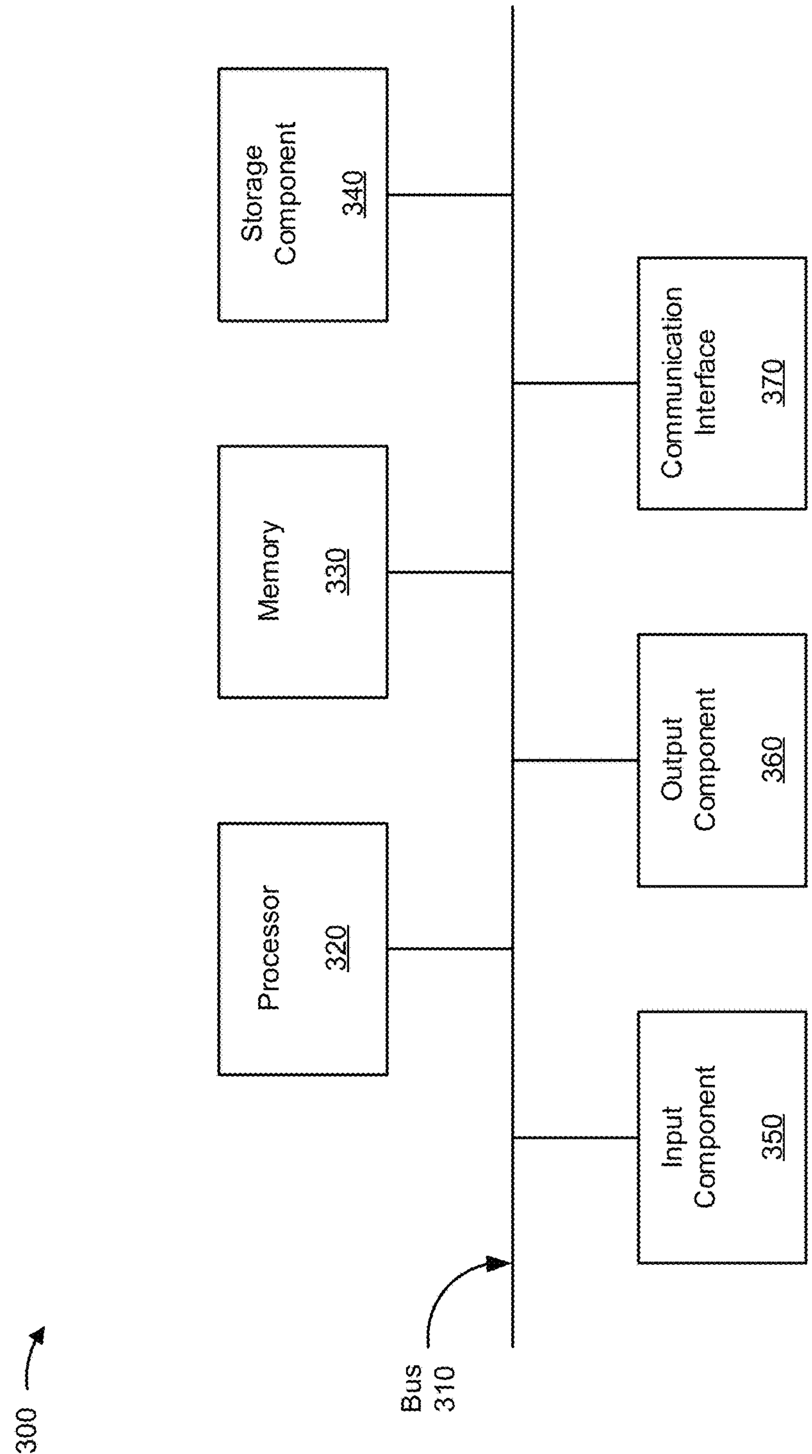
FIG. 3 is a diagram of example components of one or more devices of FIG. 2.

FIG. 3 is a diagram of example components of a device 300. Device 300 can correspond to user device 210 and/or parking system 220. In some implementations user device 210 and/or parking system 220 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
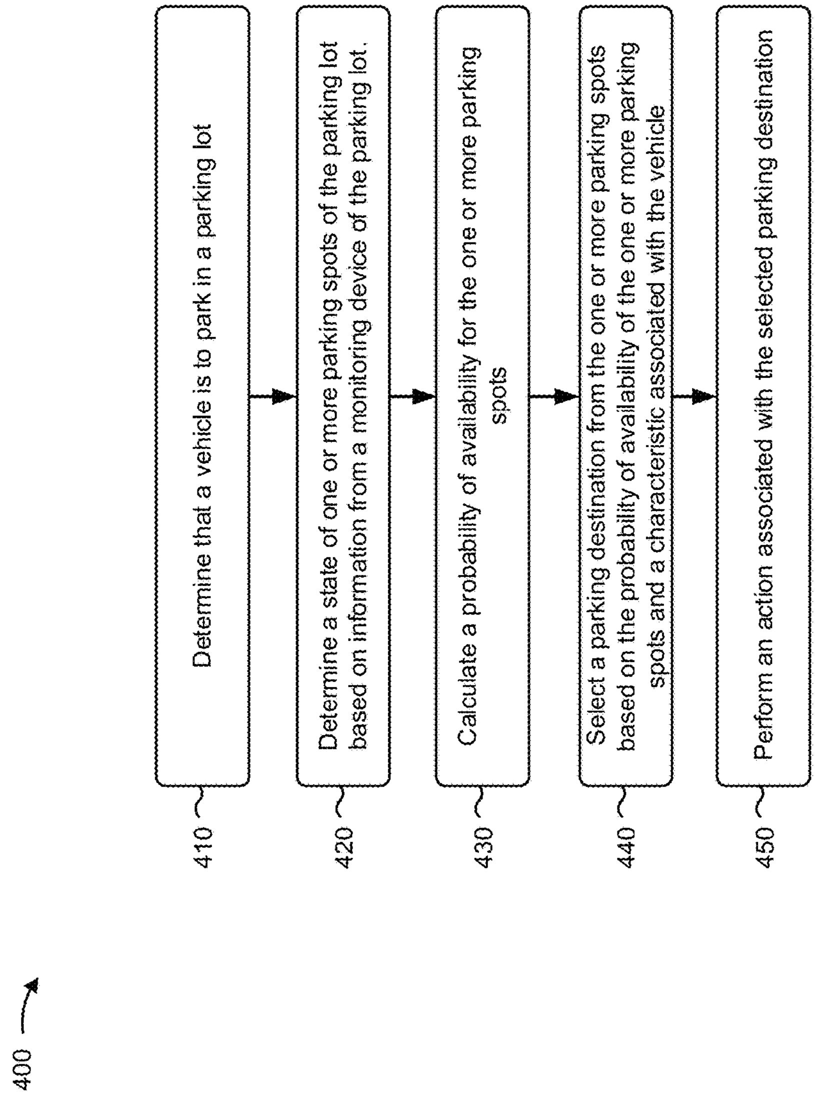

FIG. 4 is a flow chart of an example process 400 for identifying and/or indicating available and/or likely available parking spots of a parking lot. In some implementations, one or more process blocks of FIG. 4 can be performed by parking system 220. In some implementations, one or more process blocks of FIG. 4 can be performed by another device or a group of devices separate from or including parking system 220, such as user device 210.

As shown in FIG. 4, process 400 can include determining that a vehicle is to park in a parking lot (block 410). For example, parking system 220 can determine (or detect) a vehicle is to park in a parking lot. In some implementations, parking system 220 can determine the vehicle is to park in the parking lot based on receiving or capturing images indicating a vehicle is in (or entering) the parking lot, based on sensor information indicating that a vehicle is in the parking lot, based on a vehicle going through a security checkpoint of a parking lot, and/or the like.

According to some implementations, a vehicle can be any machine or the like that can be parked in the parking lot. For example, the vehicle can be an automobile, a motorcycle, a truck (e.g., commercial truck, a transportation truck), a trailer of a vehicle, and/or the like. Furthermore, a parking lot can be any area, structure, and/or the like reserved or available for vehicles to park. A parking lot includes a plurality of parking spots which can be selected as a parking destination for a vehicle, according to some implementations described herein.

In some implementations, parking system 220 can determine that a vehicle is to park in a parking lot based on a request from user device 210. For example, user device 210, which can be a vehicle control system, a device (e.g., a smartphone, a GPS device, and/or the like) within the vehicle can submit a request for a parking spot to parking system 220. Accordingly, based on the request, parking system 220 can determine that the vehicle is to park in the parking lot.

According to some implementations, parking system 220 can determine a vehicle is to park in a parking lot based on when a vehicle enters the parking lot by crossing a particular threshold, location, and/or entrance to the parking lot. In some implementations, parking system 220 can determine a vehicle has entered the parking lot based on the vehicle being captured by a camera of parking monitor 230, sensed by a sensor of parking monitor 230, based on a security device allowing the vehicle to access the parking lot, based on GPS information received from the vehicle (or a device of the vehicle), and/or the like.

In some implementations, parking system 220 can determine a vehicle is to park in a parking lot by performing an image analysis of one or images from one or cameras of parking monitor 230. For example, parking system 220 can analyze images using at least one of pattern recognition, object recognition, image segmentation (e.g., entropy-based segmentation), motion detection (e.g., single particle tracking), video tracking, optical flow, facial recognition, and/or the like. Based on the images and/or image analysis, parking system 220 can determine that a vehicle is to park in the parking structure.

Additionally, or alternatively, parking system 220 can receive sensor information indicating that a vehicle is to park in a parking lot. For example, one or more sensors (e.g., radar sensors, motion sensors, pressure sensors, audio sensors, temperature sensors, and/or the like) can be placed throughout a parking lot and used to sense (or detect) characteristics of the parking lot. Accordingly, such sensors can provide information to parking system 220 indicating that a vehicle is to park the parking lot.

In some implementations, parking system 220 can determine a vehicle is to park in a parking lot via communication from a security device. For example, the security device can include an access terminal or gate system that authorizes entry to the parking lot (e.g., via a key card, monetary transaction, interaction with a parking attendant, and/or the like). Accordingly, when there is an interaction with the security device, parking system 220 can determine that a vehicle is to park in the parking lot.

In this way, parking system 220 can determine a vehicle entering a parking lot such that parking system 220 can determine available parking spots within which the vehicle can park.

As further shown in FIG. 4, process 400 can include determining a state of one or more parking spots of the parking lot based on information from a monitoring device of the parking load (block 420). For example, parking system 220 can determine the state of the plurality of parking spots of the parking lot based on information from parking monitor 230. In some implementations, parking system 220 can determine the state of the plurality of parking spots based on determining that the vehicle entered the parking lot.

According to some implementations, the information from the monitoring device can be any information from parking monitor 230 (e.g., images, messages, text, files, and/or the like). In some implementations, the information can be streamed to parking system 220 (e.g., via network 240) via a network and/or communication link. As used herein, the state of the plurality of the parking spots can correspond to physical characteristics of the parking spots. For example, a state of a parking spot can indicate that the parking spot is occupied (e.g., includes a vehicle or object), empty, has particular dimensions (e.g., which can fluctuate due to vehicles or objects in adjacent parking spots), has a person near or walking toward the parking spot, has a vehicle leaving the parking lot, and/or the like). In some implementations, parking system 220 can eliminate parking spots based on a person walking by parking spots toward other parking spots. Additionally, or alternatively, an image of a person can be captured as the person arrives at a parking spot (e.g., when the person exits a vehicle). In such cases, when an image of the person is captured heading toward the parking lot, parking system 220 can determine that the parking spot where the image of the person was initially captured can soon be available (e.g., under the presumption that the person is heading to the vehicle in the parking spot to leave the parking lot) to other vehicles.

According to some implementations, parking system 220 can analyze the information using image analysis from cameras, data analysis from sensors and/or security devices, and/or the like to determine the state of the plurality of parking spots. In some implementations, parking system 220 can implement machine learning to analyze the state of the parking spots. For example, parking system 220 can utilize artificial intelligence to learn statuses of parking spots based on tracking the information, recognizing patterns in the information, and making a prediction about the state a parking spot. More specifically, in some implementations, based on analyzing information relating to the parking spots, parking system 220 can predict a length of time that a particular vehicle may be in a parking spot. For example, an amount of time may vary greatly based on venues near the parking lot (e.g., busy restaurants, non-busy restaurants, movie theaters, grocery stores, etc.). In such cases, parking system 220 may determine that vehicles may be parked for a particular length of time (e.g., 60 minutes to eat at a restaurant). In some implementations, parking system 220 can utilize feedback (e.g., from user device 210) and track a success rate for improving the machine learning.

In this way, parking system 220 can determine a state of a plurality of parking spots of a parking lot to enable parking system 220 to calculate a probability that the parking spots can be available for vehicle parking.

As further shown in FIG. 4, process 400 can include calculate a probability of availability for the one or more parking spots (block 430). For example, parking system 220 can calculate a probability that one or more of the parking spots can be available to receive the vehicle. In some implementations, parking system 220 can calculate the probability of availability of the one or more parking spots based on the state of the plurality of parking spots.

As used herein, the probability of availability for a parking spot indicates a likelihood that the parking spot is to be empty or unoccupied when a vehicle reaches the parking spot, such that the vehicle can park in the parking spot. Parking system 220 can use information from parking monitor 230 to calculate the probability of availability of parking spots in a parking lot. For example, parking system 220 can calculate a probability of availability based on an occupancy status of the parking spots (whether they are occupied, empty, or include an object), a presence of a person within a threshold range (e.g., within 1-2 meters) of the parking spots or heading toward the parking spots, a presence of a vehicle appearing to leave the one or more spots (e.g., based on the vehicle running, based on brake lights being on, and/or the like); or a presence of a vehicle appearing to enter the one or more parking spots (e.g., by determining the vehicle is continuously approaching the parking spots).

In some implementations, parking system 220 can calculate the probability of availability of each of the plurality of parking spots or a set of the plurality of parking spots. For example, in some implementations, parking system 220 may not calculate a probability of availability for all parking spots of a parking lot (e.g., to conserve computing resources and/or calculation time). In such a case, parking system 220 can cease calculating probabilities of availability when parking system 220 calculates a threshold probability of availability of a parking spot (e.g., a probability indicating that the parking spot has an 80% chance, 90% chance, or greater of being available when the vehicle reaches the parking spot). Accordingly, with the threshold probability of availability found, it may not be necessary for parking system 220 to continue calculating probabilities of availability for other parking spots, as it is likely that the vehicle would choose the parking spot that has the threshold probability of availability.

Additionally, or alternatively, parking system 220 may not calculate probability of availability for particular parking spots based on characteristics of the parking spots and/or characteristics of the vehicle. For example, parking system 220 may not consider handicap parking spots for vehicles that cannot park in handicap spaces, parking spots for compact cars for trucks or vehicles with dimensions indicating the vehicle is not compact (e.g., if the vehicle is too large to fit in a compact car spot), parking spots under a low clearance area for vehicles having a clearance height that exceeds the low clearance height, and/or the like. In some implementations, parking system 220 can receive or obtain the characteristics of the vehicle via user device 210 (e.g., via an application on user device 210 that is associated with parking system 220).

In some implementations, parking system 220 can utilize a probability scoring system to calculate a probability of availability of a parking spot of the parking lot based on characteristics of the parking spot. For example, parking system 220 can apply probability scores and/or weights (w) to parameters corresponding to characteristics of the parking spots and/or characteristics of the vehicle (e.g., an occupancy status, a presence of a person with a threshold range of the parking spots, a presence of a vehicle appearing to leave/enter the parking spots). As such, parking system 220 can calculate probability of availability scores ($p_i$) for a set of the parking spots in the parking lot based on the probability scoring system, and parking system. For example, parking system 220 can calculate the following probability of availability score ($p_{ij}$) for a parking spot i for a vehicle j:

$$p_{ij}=w_{aj}a_i+w_{bj}b_i+w_{cj}c_i \quad (1)$$

where $w_{aj}$, $w_{bj}$, $w_{cj}$ can correspond to adjusted weights based on vehicle j (e.g., based on type of car, distance from car to parking spot, etc.) for parameters $a_i$, bi, $c_i$ that correspond to characteristics of the parking spot i.

As an example, parking system 220 can calculate a higher probability of availability to a parking spot that is empty versus one that is occupied. As another example, parking system 220 can assign a higher probability of availability to a parking spot that includes a vehicle leaving the parking spot (e.g., based on movement of the vehicle or detecting brake lights of the vehicle are on, etc.) than to a parking spot that has a person near the parking spot. Accordingly, parking system 220 can assign various weights to characteristics, such as occupancy, vehicle arriving/leaving, person present, and/or the like associated with the state of the parking spots to calculate probability scores and/or availability scores of a parking spot.

In some implementations, parking system 220 can use characteristics of the vehicle in calculating probability of availability. For example, parking system 220 can factor the following into a calculation: a location of the vehicle, distance between the vehicle and the parking spot, an estimated time of arrival at the parking spot (e.g., which can include speed conditions, traffic conditions, parking lot congestion, and/or the like), and/or the like. For example, the greater the length of time to reach a parking spot or further the vehicle is from the parking lot, the less likely parking system 220 can determine that the parking spot is going to be available.

When calculating probability of availability, parking system 220 can also consider the state of the parking lot as a whole. For example, if the parking lot is at 80% capacity, parking system 220 can determine that parking spots are less likely to be available. Furthermore, parking system 220 can determine that probabilities can be lower in particular regions of a parking lot if a higher percentage of the parking spots in those particular regions are occupied. As another example, parking system 220 can determine that parking spots are less likely to be available when near a particular location (e.g., parking spots near a grocery store entrance), versus parking spots further from the particular location (e.g. parking spots far from grocery store entrance).

In some implementations, machine learning can be used in the probability scoring system by adjusting probability scores and/or weights for the characteristics of the parking spots. For example, based on success rate of vehicles being able to park (e.g., at a percentage that is relatively equivalent to the calculated probability of availability), parking system 220 can implement machine learning to evolve the probability scoring system for calculating the probability of availability of parking spots in a parking lot.

In this way, parking system 220 can calculate a probability of availability of parking spots to determine which parking spot should be a parking destination of the vehicle.

As further shown in FIG. 4, process 400 can include selecting a parking destination from the one or more parking spots based on the probability of availability of the one or more parking spots and a characteristic associated with the vehicle (block 440). For example, parking system 220 can select the parking destination based on the probability of availability and one or more characteristics of the vehicle. In some implementations, parking system 220 selects the parking destination based on calculating the probability of availability of the parking spots.

As used herein, the characteristics of the vehicle can include dimensions of the vehicle, restrictions/privileges of the vehicle (e.g., handicap registered, compact, clearance height, and/or the like), a location of the vehicle, a speed of the vehicle, traffic near or between the vehicle and the parking spots (or parking lot), and/or the like.

In some implementations, parking system 220 can determine the one or more parking spots as candidate parking spots based on the characteristics of the vehicle. For example, parking system 220 can determine which parking spots of the parking lot satisfy dimensional requirements (height, width clearance), restriction requirements (e.g., handicap, resident, employee, zone, and/or the like), and/or the like of the vehicle.

Additionally, or alternatively, parking system 220 can select the parking spot from the one or more parking spots based on the parking spot having a highest probability of availability. In other words, parking system 220 can select that parking spot that is most likely to be available when the vehicle reaches the parking spot. In some implementations a plurality of spots can selected. For example, parking system 220 can select parking spots that have a threshold likelihood of availability (e.g., 75%) likely to be available and/or that are within a threshold distance of a destination associated with the vehicle.

In this way, parking system 220 can select a parking destination for a vehicle to enable the parking system 220 to perform an action associated with the parking destination.

As further shown in FIG. 4, process 400 can include performing an action associated with the selected parking destination (block 450). For example, For example, parking system 220 can perform the action associated with the parking destination. In some implementations, parking system 220 performs the action based on selecting a parking destination for the vehicle.

In some implementations, parking system 220 can perform an action including transmitting (or sending) location information of a parking destination to user device 210 (e.g., via a text, via an application (e.g., a map application, a navigation application, a parking application, and/or the like), via an image of the parking spot, via geographical coordinates, and/or the like). Furthermore, parking system 220 can transmit navigation instructions to enable the vehicle (or a driver of the vehicle) to navigate to the parking destination. Additionally, or alternatively, parking system 220 can indicate a probability of availability of the parking spot to a user. In some instances, parking system 220 can offer a driver (or other user) (e.g., via user device 210) to select a different parking spot (e.g., a parking spot that has the next highest likelihood of availability). In some implementations, parking system 220 can send characteristics of the parking destination (e.g., dimensions, restrictions, and/or the like) and/or the parking lot (e.g., current capacity, entrance location, and/or the like).

According to some implementations, users (e.g., drivers of vehicles) and/or vehicles can register an account with parking system 220, provide user device 210 information (e.g., contact information or characteristics) and/or vehicle information (e.g., license plate number, make, model, type, color, dimensions, registrations, characteristics, and/or the like) to enable parking system 220 to identify the vehicle and/or communicate with user device 210. In some implementations, parking system 220 can detect an account associated with the vehicle based on an identifier on the vehicle (e.g., a license plate). For example, parking system 220 can receive an image of a license plate on the vehicle, lookup the license plate in an account database to find user device 210, which can be associated with an account of parking system 220. Accordingly, after identifying user device 210, parking system 220 can send location information and/or navigation instructions to user device 210, as described above.

Additionally or alternatively, parking system 220 can reserve the parking destination for the vehicle. For example parking system 220 can mark the parking destination as occupied (e.g., via an indicator at the parking spot), by blocking access to the parking destination (e.g., using a gate), and/or the like. In some implementations, parking system 220 can indicate the parking spot corresponding to the parking destination is occupied in a parking spot tracking system of parking system 220. Such a parking lot tracking system can indicate availability of parking spots in the parking lot.

In some implementations, parking system 220 can request and/or accept payment from user device 210 (and/or an institution associated with user device 210). For example, upon identifying an available spot or likely available spot for the vehicle, parking system 220 can request or offer user device 210 to pay for the parking spot.

In this way, parking system 220 can perform an action associated with the parking destination to enable the vehicle to park in the parking destination.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

FIG. 5 is a flow chart of an example process 500 for identifying and/or indicating available and/or likely available parking spots of a parking lot. In some implementations, one or more process blocks of FIG. 5 can be performed by parking system 220. In some implementations, one or more process blocks of FIG. 5 can be performed by another device or a group of devices separate from or including parking system 220, such as user device 210. In some implementations, example process 500 can be performed before, during, or after process blocks of example process 400 of FIG. 4.

As shown in FIG. 5, process 500 can include receiving information associated with a destination associated with a vehicle (block 510). For example, parking system 220 can receive the information associated with the destination. In some implementations, parking system 220 can receive the information based on receiving a request for a parking spot (e.g., from user device 210).

According to some implementations, the destination associated with the vehicle can be a particular location. Accordingly, the information associated with the destination can include a street address, an intersection, GPS coordinates, a landmark, and/or the like of the destination.

Parking system 220 can receive the information from user device 210 via network 240. In some implementations, parking system 220 can receive the information via an application on user device 210 that is associated with parking system 220, via a navigation application, via a map application, and/or the like.

As further shown in FIG. 5, process 500 can include selecting a parking destination from parking spots of a parking lot based on a probability of availability of the parking destination and the information associated with destination (block 520). For example, parking system 220 can select the parking destination from the parking spots of the parking lot. In some implementations, parking system 220 selects the parking destination based on receiving the information associated with the destination.

According to some implementations, parking system 220 can consider both a probability of availability and distance between parking spots and a destination associated with the vehicle. Accordingly, parking system 220 can not necessarily select a most likely available parking spot as the parking destination, but can select a likely available parking spot that is closer to the destination associated with the vehicle than the most likely available parking spot.

In some implementations, parking system 220 can utilize a scoring system to select a parking spot of the parking lot based on the probability of availability of the parking spots and/or characteristics associated with the vehicle. For example, scores and/or weights can be applied to the probability of availability of the parking spots and/or a destination of the vehicle. Scores can be calculated for one or more of the parking spots in the parking lot based on the scoring system, and parking system 220 can select a parking destination based on the score for that parking spot relative to the others and/or based on that parking spot having a score that satisfies a threshold. Accordingly, parking system 220 can score the parking spots of the parking lots based on probability of availability and/or distance to the destination. In some instances, probability of availability can be weighted more heavily than distance to the destination (and vice versa). Accordingly, an optimal parking spot (i.e., optimal relative to the scoring system) can be selected for a vehicle from the plurality of parking spots in the parking lot.

As an example, a first parking spot that has a probability of availability can be relatively far from the destination associated with the vehicle while a second parking spot that has a low probability of availability can be closer to the destination. Depending on weighting of the scoring system used by parking system 220 to select the transaction card, parking system 220 can select the first parking spot for the vehicle if probability of availability is more heavily weighted than distance to the destination, or parking system 220 can select the second parking spot if distance to the destination is more heavily weighted than probability of availability.

As further shown in FIG. 5, process 500 can include performing an action associated with the parking destination (block 530). For example, parking system 220 can perform the action. In some implementations, parking system can perform the action based on selecting the parking destination. In process block 530, parking system 220 can perform one or more actions described above in connection with process block 450 of FIG. 4.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

Accordingly, some implementations described herein provide a parking system capable of identifying available or likely available parking spots in a parking lot based on calculating a probability of availability of the parking spots. In some implementations, information associated with the availability of the parking spots can be provided, such that a driver and/or vehicle may not have to search for the available parking spot, thus saving vehicle resources (e.g., fuel, tire tread, engine life, battery life, brake pads, processing resources, and/or the like). Additionally, or alternatively, an optimal parking spot (relative to a scoring system), can be identified based on the probability of availability and an ultimate destination of a user and/or vehicle (e.g., such that a driver or vehicle can avoid parking at an opposite end of a parking lot when a parking spot is available or likely to be available nearer the destination).

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
determine that a vehicle is to park in a parking lot;
receive information relating to one or more parking spots of the parking lot,
the information being received from a monitoring device of the parking lot;
determine a state of the one or more parking spots of the parking lot,
the state being determined based on the information from the monitoring device of the parking lot;
calculate a probability of availability for the one or more parking spots based on weighted parameters corresponding to one or more characteristics of the one or more parking spots,
where the weighted parameters are weighted based on a characteristic associated with the vehicle;
select a parking destination from the one or more parking spots,
the parking destination being selected based on the probability of availability of the one or more parking spots; and
perform an action associated with the selected parking destination.

2. The device of claim 1, where the one or more characteristics of the parking lot include at least one of: an occupancy status of the one or more parking spots; a presence of a person within a threshold range of the one or more parking spots; a presence of a vehicle appearing to leave the one or more parking spots; or a presence of a vehicle appearing to enter the one or more parking spots.

3. The device of claim 1, where the one or more processors are further to:
receive information associated with a destination associated with the vehicle; and
select the parking destination from the one or more parking spots based on the information associated with the destination.

4. The device of claim 1, where the one or more processors, when determining the state of the one or more parking spots, are to perform at least one of:
image analysis on images received from the monitoring device; or
data analysis on sensor data received from the monitoring device.

5. The device of claim 1, where the one or more processors, when performing the action, are to:
transmit location information indicating a location of the parking destination in the parking lot.

6. The device of claim 1, where the one or more processors, when performing the action, are to:
transmit instructions for navigating from a location of the vehicle to the parking destination.

7. The device of claim 1, where the one or more processors, when performing the action, are to:
identify an account associated with an identifier on the vehicle;
determine a user device associated with the account; and
provide location information indicating a location of the parking destination to the user device.

8. A method, comprising:
determining, by a device, that a vehicle is to park in a parking lot;
receiving information relating to one or more parking spots of the parking lot,
the information being received from a monitoring device of the parking lot;
determining, by the device, a state of the one or more parking spots of the parking lot,
the state determined based on the information from the monitoring device of the parking lot;
calculating, by the device, a probability of availability for the one or more parking spots based on weighted parameters corresponding to one or more characteristics of the one or more parking spots,
where the weighted parameters are weighted based on a characteristic associated with the vehicle;
selecting, by the device, a parking destination from the one or more parking spots,
the parking destination being selected based on the probability of availability of the one or more parking spots; and
performing, by the device, an action associated with the selected parking destination.

9. The method of claim 8, where the one or more characteristics of the parking lot include at least one of:
an occupancy status of the one or more parking spots;
a presence of a person within a threshold range of the one or more parking spots;
a presence of a vehicle appearing to leave the one or more parking spots; or
a presence of a vehicle appearing to enter the one or more parking spots.

10. The method of claim 8, further comprising:
receiving information associated with a destination associated with the vehicle; and
selecting the parking destination from the one or more parking spots based on the information associated with the destination.

11. The method of claim 8, where determining the state of the one or more parking spots comprises performing at least one of:
image analysis on images received from the monitoring device; or
data analysis on sensor data received from the monitoring device.

12. The method of claim 8, where performing the action comprises:
transmitting location information indicating a location of the parking destination in the parking lot.

13. The method of claim 8, where performing the action comprises:
transmitting instructions for navigating from a location of the vehicle to the parking destination.

14. The method of claim 8, where performing the action comprises:

identifying an account associated with an identifier on the vehicle;

determining a user device associated with the account; and providing location information indicating a location of the parking destination to the user device.

15. A non-transitory computer-readable medium storing instructions, the instructions comprising:

one or more instructions that, when executed by one or more processors, cause the one or more processors to:

determine that a vehicle is to park in a parking lot;

receive information relating to one or more parking spots of the parking lot, the information being received from a monitoring device of the parking lot;

determine a state of the one or more parking spots of the parking lot, the state being determined based on the information from the monitoring device of the parking lot;

calculate a probability of availability for the one or more parking spots based on weighted parameters corresponding to one or more characteristics of the one or more parking spots, where the weighted parameters are weighted based on a characteristic associated with the vehicle;

select a parking destination from the one or more parking spots, the parking destination being selected based on the probability of availability of the one or more parking spots; and perform an action associated with the selected parking destination.

16. The non-transitory computer-readable medium of claim 15, where the one or more characteristics of the parking lot include at least one of:

an occupancy status of the one or more parking spots;

a presence of a person within a threshold range of the one or more parking spots;

a presence of a vehicle appearing to leave the one or more parking spots; or a presence of a vehicle appearing to enter the one or more parking spots.

17. The non-transitory computer-readable medium of claim 15, where the one or more instructions, when executed by the one or more processors, further cause the one or more processors to:

receive information associated with a destination associated with the vehicle; and select the parking destination from the one or more parking spots based on the information associated with the destination.

18. The non-transitory computer-readable medium of claim 15, where the one or more instructions, that cause the one or more processors to determine the state of the one or more parking spots, cause the one or more processors to:

perform at least one of:

image analysis on images received from the monitoring device; or data analysis on sensor data received from the monitoring device.

19. The non-transitory computer-readable medium of claim 15, where the one or more instructions, that cause the one or more processors to perform the action, cause the one or more processors to:

transmit location information indicating a location of the parking destination in the parking lot.

20. The non-transitory computer-readable medium of claim 15, where the one or more instructions, identify an account associated with an identifier on the vehicle;

determine a user device associated with the account; and provide location information indicating a location of the parking destination to the user device.

* * * * *